US012603370B2

(12) United States Patent
Kellner et al.

(10) Patent No.: US 12,603,370 B2
(45) Date of Patent: Apr. 14, 2026

(54) TRACTION BATTERY AND VEHICLE HAVING A TRACTION BATTERY

(71) Applicant: Dr. Ing. h.c. F. Porsche Aktiengesellschaft, Stuttgart (DE)

(72) Inventors: Philipp Kellner, Renningen-Malmsheim (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 546 days.

(21) Appl. No.: 18/199,425

(22) Filed: May 19, 2023

(65) Prior Publication Data

US 2023/0378581 A1     Nov. 23, 2023

(30) Foreign Application Priority Data

May 20, 2022     (DE) ..................... 10 2022 112 737.0

(51) Int. Cl.
H01M 50/249          (2021.01)
H01M 50/209          (2021.01)
(Continued)

(52) U.S. Cl.
CPC ....... H01M 50/209 (2021.01); H01M 50/224 (2021.01); H01M 50/296 (2021.01);
(Continued)

(58) Field of Classification Search
None
See application file for complete search history.

(56) References Cited

U.S. PATENT DOCUMENTS

| | | | |
|---|---|---|---|
| 10,811,740 B2 | 10/2020 | Weicker et al. | |
| 2014/0141287 A1* | 5/2014 | Bertucci | ........... H01M 10/4207 |
| | | | 361/752 |

(Continued)

FOREIGN PATENT DOCUMENTS

| | | | | |
|---|---|---|---|---|
| DE | 102017217900 A1 * | 5/2018 | ........ | H01M 10/6556 |
| DE | 102018205962 A1 * | 10/2019 | ............. | B60L 50/64 |

(Continued)

OTHER PUBLICATIONS

German Examination Report issued Apr. 2, 2025, by the German Patent and Trademark Office in corresponding German Patent Application No. 10 2022 112 737.0 with an English translation. (8 pages).

*Primary Examiner* — Yoshitoshi Takeuchi
(74) *Attorney, Agent, or Firm* — Buchanan Ingersoll & Rooney PC

(57)          ABSTRACT

A traction battery of an electrically or semi-electrically driven vehicle includes several battery modules arranged one behind the other in a longitudinal direction of the vehicle. Each of the battery modules extends in a transverse direction of the vehicle between a left and a right vehicle longitudinal support, as well as a central battery control device connected to the battery modules. Each of the battery modules includes on its two opposing front faces a connection region with an electrical connector configured for electrical contacting. The traction battery includes, in the region of each of the two front faces of the battery modules, at least one respective busbar, which extends transversely to the connection regions and parallel to one of the vehicle longitudinal members and is configured so as to electrically connect at least some of the battery modules to one another and/or to the central battery control device.

10 Claims, 4 Drawing Sheets

(51) Int. Cl.

| | |
|---|---|
| *H01M 50/224* | (2021.01) |
| *H01M 50/296* | (2021.01) |
| *H01M 50/298* | (2021.01) |
| *H01M 50/505* | (2021.01) |
| *H01M 50/507* | (2021.01) |
| *H01M 50/51* | (2021.01) |
| *H01M 50/514* | (2021.01) |
| *H01M 10/42* | (2006.01) |

(52) U.S. Cl.

CPC ........ *H01M 50/505* (2021.01); *H01M 10/425* (2013.01); *H01M 2010/4278* (2013.01); *H01M 50/249* (2021.01)

(56) References Cited

U.S. PATENT DOCUMENTS

| | | | | |
|---|---|---|---|---|
| 2015/0171401 A1* | 6/2015 | Kim | .................... | H01M 50/296 |
| | | | | 429/158 |
| 2015/0287964 A1* | 10/2015 | Park | .................... | H01M 10/643 |
| | | | | 429/87 |
| 2016/0211497 A1* | 7/2016 | Motokawa | ............ | H01M 10/46 |
| 2017/0010330 A1* | 1/2017 | Götz | .................... | H01M 10/482 |
| 2018/0201153 A1* | 7/2018 | Sturza | ................. | H01R 25/162 |
| 2018/0331396 A1* | 11/2018 | Soki | ................... | G01R 31/3828 |
| 2019/0123318 A1* | 4/2019 | Fees | ...................... | H01M 50/51 |
| 2019/0288263 A1* | 9/2019 | Kato | ................... | H01M 50/509 |
| 2019/0393571 A1* | 12/2019 | Weicker | .............. | H01M 50/505 |
| 2021/0134480 A1* | 5/2021 | Dawson | .................. | H01B 5/02 |
| 2022/0344726 A1* | 10/2022 | Hwang | ................ | H01M 10/34 |

FOREIGN PATENT DOCUMENTS

| | | | | | |
|---|---|---|---|---|---|
| DE | 112020003812 | T5 | 5/2022 | | |
| DE | 102022113594 | A1 * | 11/2023 | ........ | H01M 10/6556 |

* cited by examiner

TRACTION BATTERY AND VEHICLE HAVING A TRACTION BATTERY

CROSS-REFERENCE TO RELATED APPLICATION

This application claims priority to German Patent Application No. 10 2022 112 737.0, filed May 20, 2022, the content of such application being incorporated by reference herein in its entirety.

FIELD OF THE INVENTION

The invention relates to a traction battery of an electrically or semi-electrically driven vehicle, comprising several battery modules arranged one behind the other in a longitudinal direction of the vehicle, each of which comprises at least one sealed battery module housing and at least one battery cell housed within the battery module housing, wherein each of the battery modules is configured so that it extends in a transverse direction of the vehicle between a left and a right vehicle longitudinal support, in particular between a left and a right vehicle longitudinal member, as well as a central battery control device connected to the battery modules, wherein each of the battery modules comprises on its two opposing front faces a connection region with electrical connection means configured for electrical contacting, and wherein the traction battery comprises, in the region of each of the two front faces of the battery modules, at least one respective busbar, which extends transversely to the connection regions and substantially parallel to one of the vehicle longitudinal members and is configured so as to electrically connect at least some of the battery modules to one another and/or to the central battery control device.

BACKGROUND OF THE INVENTION

Fully electrically or semi-electrically driven vehicles have a traction battery, by means of which an electric drive apparatus can be supplied with electrical power that is electrochemically stored in the traction battery. For packaging reasons, such a traction battery is very often arranged in the region of an underbody of the vehicle.

A traction battery as it is known in the prior art in various embodiments comprises a battery case within which one or more electrically interconnected battery modules are typically housed. The battery housing also seals the battery modules against the surrounding environment, thereby in particular preventing moisture and dust from penetrating into the interior of the battery module.

DE 10 2018 205 962 A1, which is incorporated by reference herein, discloses a traction battery for a fully electrically or semi-electrically driven vehicle having at least one battery module extending between a left lateral longitudinal support and a right lateral longitudinal support and comprising two battery cell packages arranged one behind the other in the vehicle transverse direction and electrically interconnected in the center. In the center of the vehicle in the transverse direction, a connection region is provided, via which the battery cell packets are electrically interconnected. The electrical circuitry is complex depending on the number of cells, because the contacting must always occur in the center of the vehicle.

U.S. Pat. No. 10,811,740 B2, which is incorporated by reference herein, relates to a battery-electric vehicle having a generic traction battery comprising individually sealed battery modules arranged one behind the other in the longitudinal direction of the vehicle between the longitudinal members. The battery modules have front-face connectors. Busbars extend along each of the two longitudinal members of the vehicle and electrically connect the battery modules to one another via their front-face connectors. The problem exists that the busbars may become damaged during operation, so that a proper function of the traction battery is then no longer given.

SUMMARY OF THE INVENTION

Described herein is a traction battery of the aforementioned type having greater operational safety.

A traction battery according to aspects of the invention wherein the traction battery comprises, in the region of each of the two front faces of the battery modules, a respective sealed conduit housing, which is mechanically connected to the connection regions of the battery modules and within which at least one of the busbars is respectively housed.

A traction battery for a fully electrically or semi-electrically driven vehicle in which several sealed battery modules are housed in the vehicle, in particular in an underbody region of the vehicle. Each of these battery modules extends in the vehicle transverse direction between a first longitudinal support and a second longitudinal support of the vehicle. Electrical connection means are attached to the battery modules on both opposing front faces of the battery modules in the vicinity of the two longitudinal members and thus on both vehicle sides. In the region of the longitudinal members, there is a respective sealed conduit housing on the left and the right vehicle sides, which run in the longitudinal direction of the vehicle and are preferably mounted so as to be sealed against the battery modules. At least some of the battery modules are electrically connected to one another and/or to the central battery control device by the busbars within the conduit housings. This constructive design offers the advantage that the design space in the middle of the battery modules can also be used for one or more battery cells. The front-face electrical connection positions allow for a simplified interconnection with less material usage on the busbars. This results in a weight and cost savings through a reduced weight of the busbars. Furthermore, there is a reduced construction space dimension in the vertical direction (z-direction), because no high-voltage conduit is required above the battery modules. Because the busbars are housed in sealed conduit housings according to the present invention, they can be effectively protected from environmental factors, in particular from moisture and dust, so that the risk of damage to the busbars can be reduced. This results in a greater operational and failure safety for the traction battery.

Preferably, the length of each of the battery modules corresponds nearly to the distance between the interiors of the left and right vehicle longitudinal supports of the vehicle. Each of the battery module housings of the battery modules can comprise at least one extrusion profile.

In a preferred embodiment, it is proposed that each of the battery modules comprise a battery cell controller.

In one embodiment, it can be provided that each of the two conduit housings comprises a housing bottom shell and a housing lid that is releasably fastened to the housing bottom shell. For example, the housing lid can be screwed to the housing bottom shell or otherwise releasably connected. In the case of service, the conduit housings can be opened by simply removing the housing lid, so that the housing interior can be accessed from the outside and maintenance can be carried out in a simple manner.

In one embodiment, there is the possibility that the housing bottom shell is configured so as to form an electromagnetic shield. Preferably, in this embodiment, the battery cell controllers of the battery modules are arranged between the battery housing and the housing bottom shell.

In an alternative embodiment, it is proposed that a shielding element be arranged within the conduit housing, which element is electrically connected to the conduit housing and which is configured so as to form an electromagnetic shield. The shielding element is preferably positioned between the busbars and the battery cell controllers in this embodiment.

In an advantageous embodiment, it can be provided that the battery cell controller of each of the battery modules is arranged within one of the conduit housings. This makes it possible for the battery cell controllers of the battery modules to be very easily reachable in the case of service by opening the housing lid of the respective conduit housing.

In one embodiment, each of the battery modules can have a plurality of battery cells arranged one behind the other in the vehicle longitudinal direction and/or adjacent to one another in the vehicle transverse direction.

In an advantageous further development, it is proposed that the battery cells be arranged as a battery cell stack, wherein each of the battery cell stacks comprises at least two battery cells positioned one above the other in the vehicle vertical direction (z-direction). Preferably, the battery module housings can each have several receiving chambers arranged one behind the other in the vehicle longitudinal direction (y-direction) and/or adjacent to one another in the vehicle transverse direction (x-direction), wherein a battery cell stack is housed in each of the receiving chambers.

In some embodiments, there is also the possibility that the longitudinal extension of the battery cell stack or battery cells in the transverse direction substantially corresponds to the length of the associated battery module in the transverse direction.

In one embodiment, it can be provided that at least one sealing element is arranged between the conduit housings and the connection regions of the battery modules. As a result, it is advantageously achieved that the interior of the battery module housing of each of the battery modules and the interior of the conduit housing form a common space sealed against the environment.

According to a further aspect, the present invention relates to a vehicle having a fully electric or semi-electric drive apparatus and a traction battery configured so as to provide electrical power to the drive device.

BRIEF DESCRIPTION OF THE DRAWINGS

Further features and advantages of the present invention become apparent from the following description of preferred embodiment examples, with reference to the appended illustrations.

DETAILED DESCRIPTION OF THE INVENTION

Figure 1:
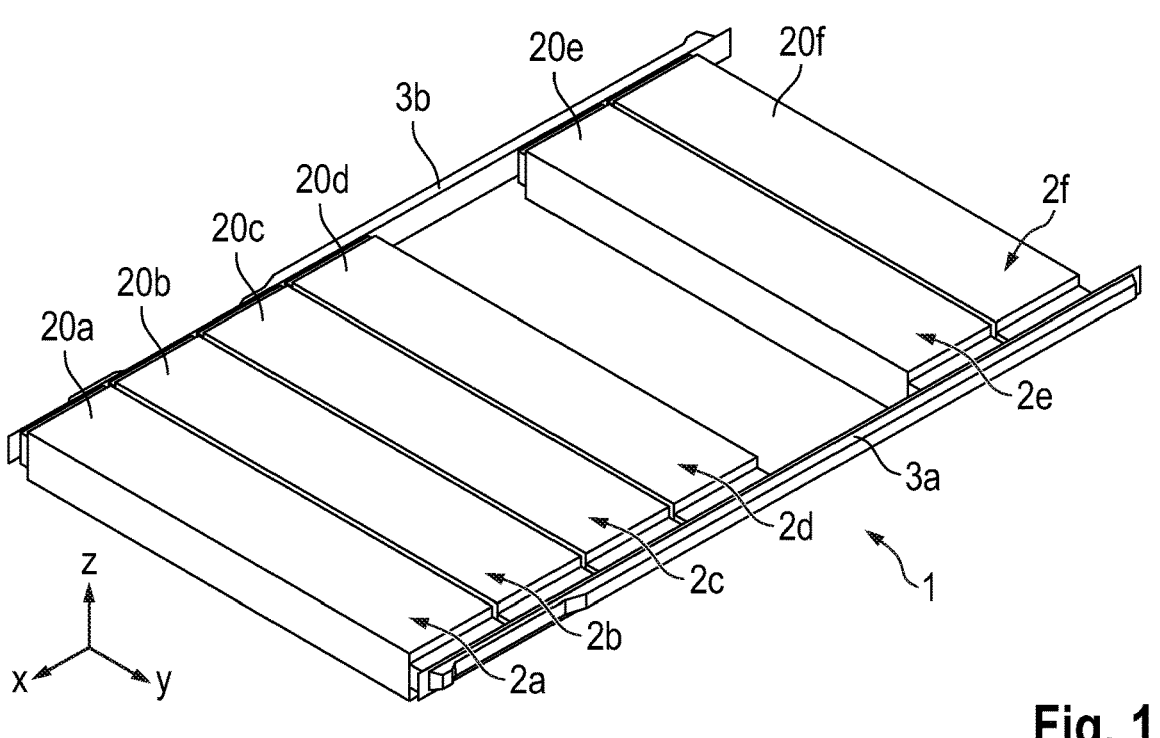
FIG. 1 is a perspective view of a traction battery for a fully electrically or semi-electrically driven vehicle, arranged according to a first embodiment example of the present invention.

Referring to FIG. 1, there is shown a traction battery 1 for a fully electrically or semi-electrically driven vehicle. The traction battery 1, which is arranged in an underbody region of the vehicle, comprises a plurality of battery modules 2a-2f that extend in transverse direction y of the vehicle and are arranged one behind the other in the longitudinal direction x. In addition to the longitudinal direction x and the transverse direction y, FIG. 1 also shows the vertical direction z. From the illustration in FIG. 1, it is clear that the battery modules 2a-2f have a greater extension in the transverse direction y than in the longitudinal direction x.

Each of the battery modules 2a-2f comprises a sealed battery module housing 20a-20f and is configured so as to extend between a left and a right vehicle longitudinal support, in particular between a left and a right vehicle longitudinal member, of the vehicle. Preferably, the length of each of the battery modules 2a-2f thus corresponds nearly to the distance between the interiors of the left and right vehicle longitudinal supports of the vehicle. Each of the battery module housings 20a-20f of the battery modules 2a-2f can preferably comprise at least one extrusion profile.

Figure 2:
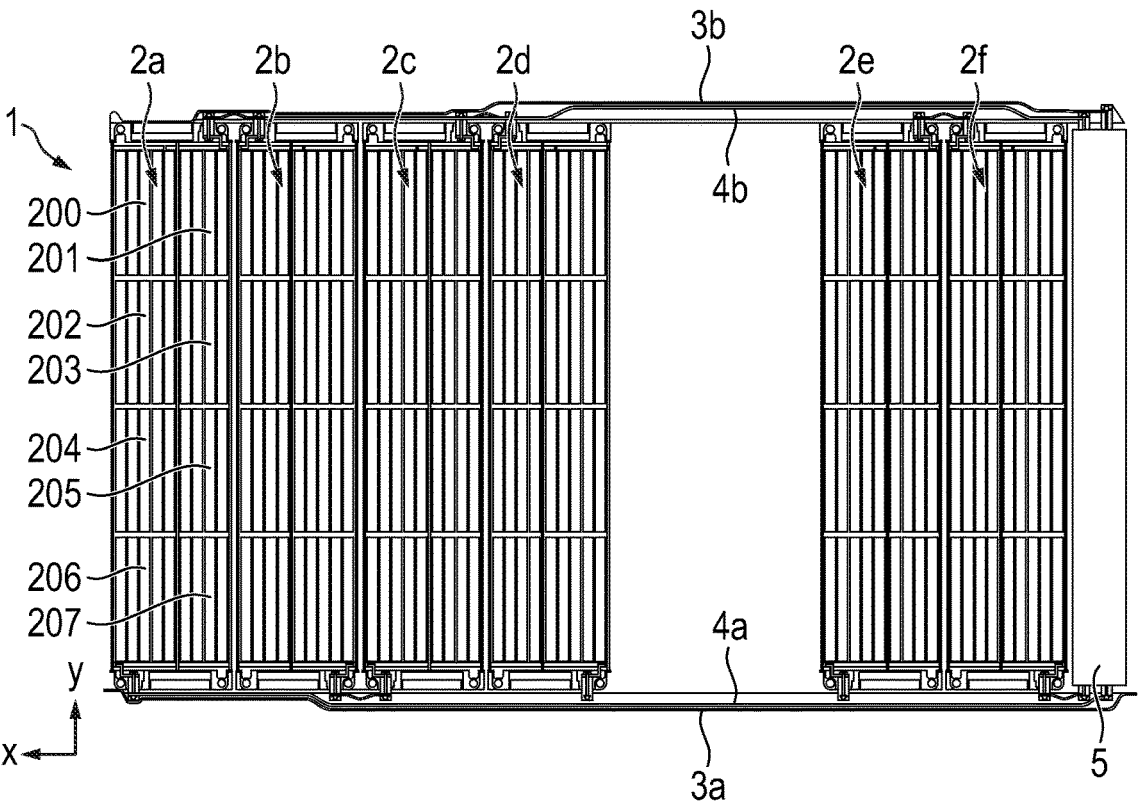
FIG. 2 is a horizontal sectional view of the traction battery according to FIG. 1.
Figure 3:
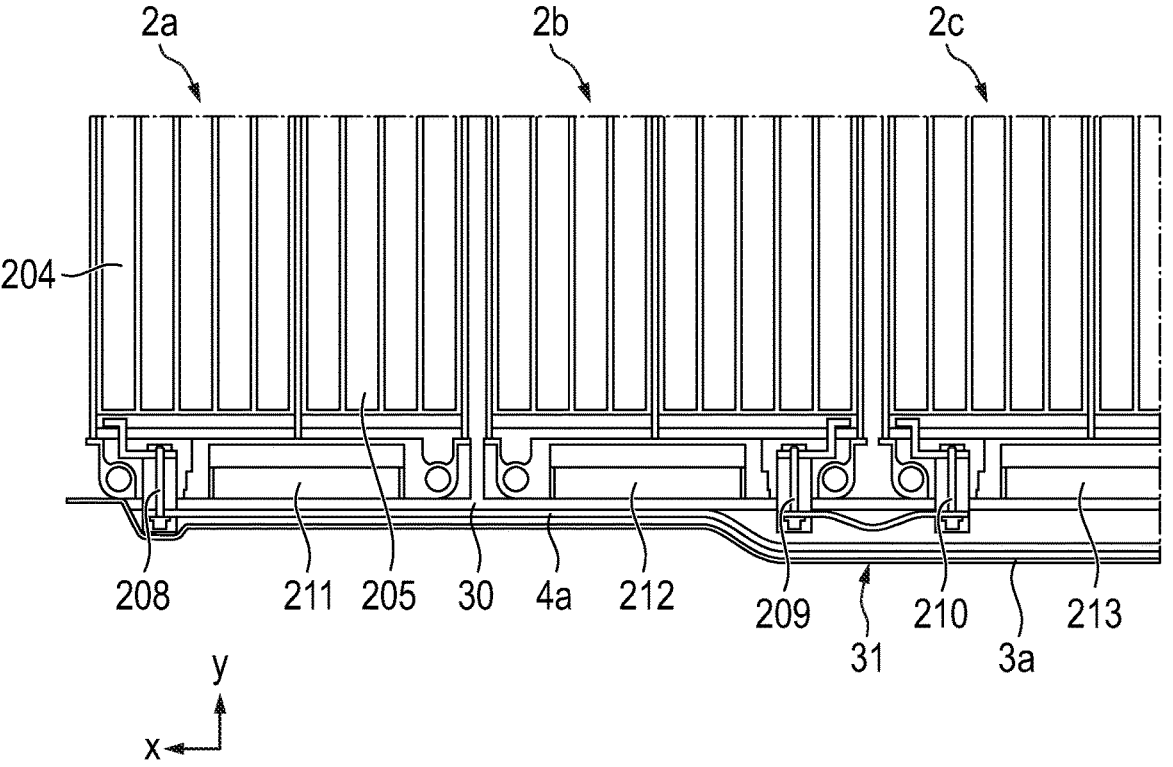
FIG. 3 is an enlarged detail of the horizontal sectional view according to FIG. 2.

Referring still to FIGS. 2 and 3, it is clear that several battery cells are housed within each of the battery module housings 20a-20f, which in the present case are configured as battery cell stacks 200-207. Each battery cell stack 200-207 preferably comprises at least two battery cells arranged one above the other in the vertical direction (z-direction). In the embodiment example shown here, each of the battery modules 2a-2f comprises several battery cell stacks 200-207 arranged adjacent to one another in the transverse direction y and one behind the other in longitudinal direction x. Preferably, the battery module housings 20a-20f each have several receiving chambers arranged one behind the other in the vehicle longitudinal direction y and/or adjacent to one another in the vehicle transverse direction x, wherein a respective battery cell stack 200-207 is housed in each of the receiving chambers.

In alternative embodiments, there is also the possibility that the longitudinal extension of the battery cell stack 200-207 or battery cells in the transverse direction y substantially corresponds to the length of the associated battery module 2a-2f in the transverse direction y.

Each of the battery modules 2a-2f comprises, on its opposing front faces, a respective connection region 208, 209, 210 with electrical connection means for electrically contacting the battery modules 2a-2f. These connection regions 208, 209, 210 are shown in FIG. 3 by way of example for the first three battery modules 2a-2c. Moreover, each of the battery modules 2a-2f comprises a battery cell controller 211, 212, 213 that controls the operation of the relevant battery module 2a-2f.

Further, in this embodiment example, the traction battery 1 comprises two sealed conduit housings 3a, 3b that extend perpendicular to the opposing front faces of the battery modules 2a-2f and thus substantially parallel to the two vehicle longitudinal supports, in particular parallel to the two vehicle longitudinal members, of the vehicle. One of the two conduit housings 3a, 3b is thus positioned near a right vehicle longitudinal support of the vehicle, whereas the other of the two conduit housings 3a, 3b is positioned near a left vehicle longitudinal support of the vehicle. The two conduit housings 3a, 3b are mechanically connected to the electrical connection regions 208, 209, 210 of the battery modules 2a-2f and preferably also sealed against the battery modules 2a-2f.

Each of the two conduit housings 3a, 3b has its interior at least one respective busbar 4a, 4b, which is configured so as to electrically connect at least some of the battery modules 2a-2f to one another and to electrically connect the battery modules 2a-2f to a central battery control device 5 of the traction battery 1. The front-face connection regions 208, 209, 210 with the electrical connection means provided therein allow for a simple electrical circuitry of individual battery modules 2a-2f to one another or a simple connection of the battery modules 2a-2f to the at least one busbar 4a, 4b, which is housed within the respective conduit housing 3a, 3b and is effectively protected against environmental influences due to the sealing, so that damage to the busbar 4a, 4b and associated functional malfunctions of the traction battery 1 can be effectively prevented.

Figure 4:
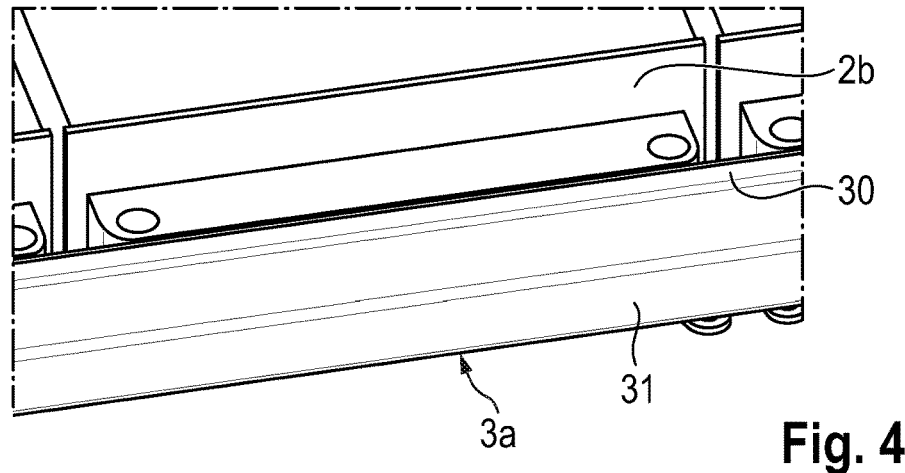
FIG. 4 is a perspective detail view of the traction battery.
Figure 5:
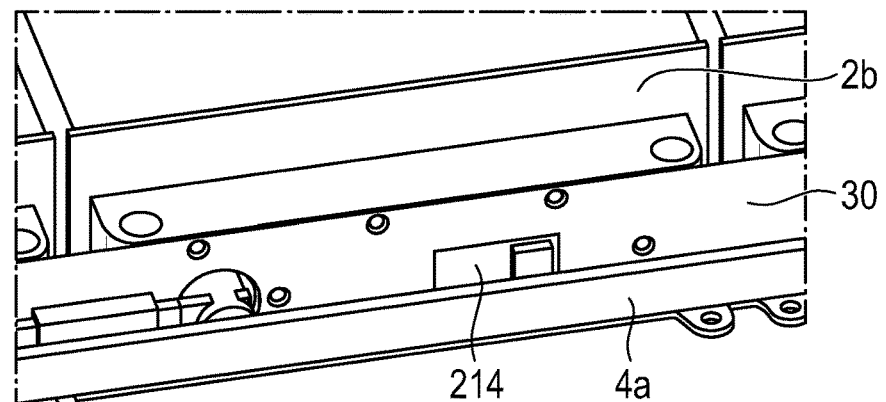
FIG. 5 is a further perspective detail view of the traction battery.
Figure 6:
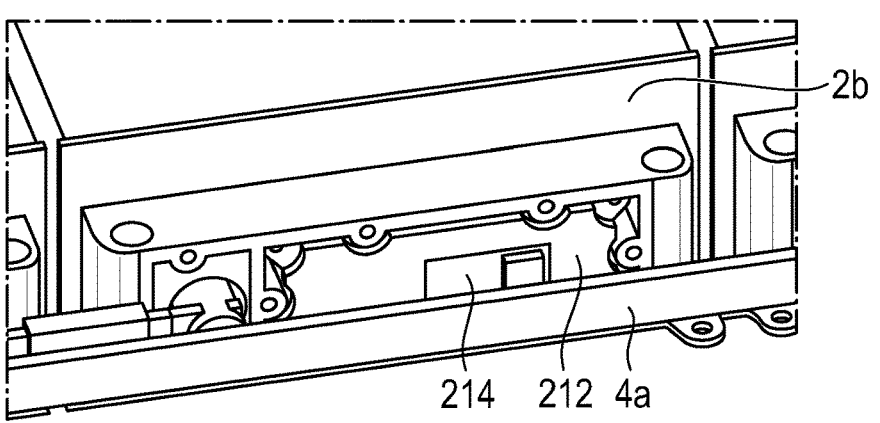
FIG. 6 is a further perspective detail view of the traction battery.

Referring still to FIGS. 4 to 6 (by way of example, only the first conduit housing 3a together with the second battery module 2b is shown here), each of the two conduit housings 3a, 3b in the embodiment example shown here is configured in two parts and comprises a bottom shell 30 as well as a housing lid 31 by means of which the bottom shell 30 can be covered. The housing lid 31 is releasably fastened to the bottom shell 30 and preferably releasably screwed to the bottom shell 30.

In the present case, the bottom shell 30, which is preferably made from sheet metal, forms an electromagnetic shield between the battery cell controller 211, 212, 213 of each of the battery modules 2a-2f and the associated busbar 4a, 4b within the conduit housing 3a, 3b. Each of the battery modules 2a-2f has on its front face a connection region 214 that can be seen in FIGS. 5 and 6 for connection of the associated battery cell controller 211, 212, 213 to the battery module 2a-2f. Thus, in this embodiment example, the battery cell controllers 211, 212, 213 are located between the battery module housing 20a-20f and the bottom shell 30 of the conduit housing 3a.

Figure 7:
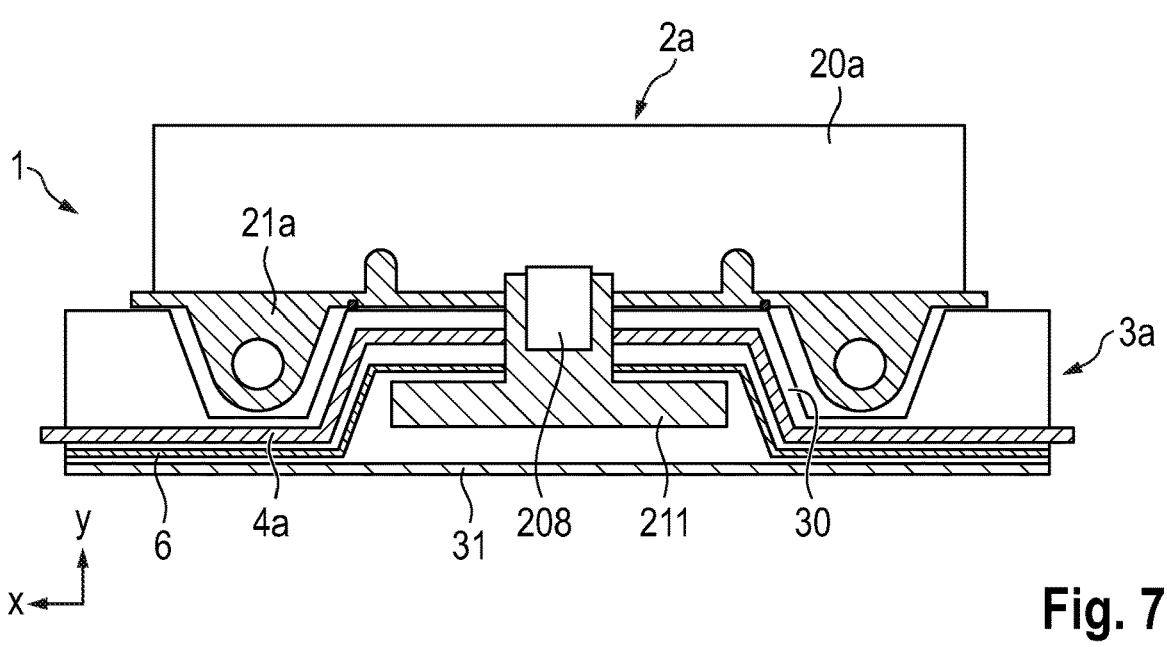
FIG. 7 is a schematic, highly simplified vertical sectional view of a battery module of a traction battery, which is carried out according to a second embodiment example of the present invention.
Figure 8:
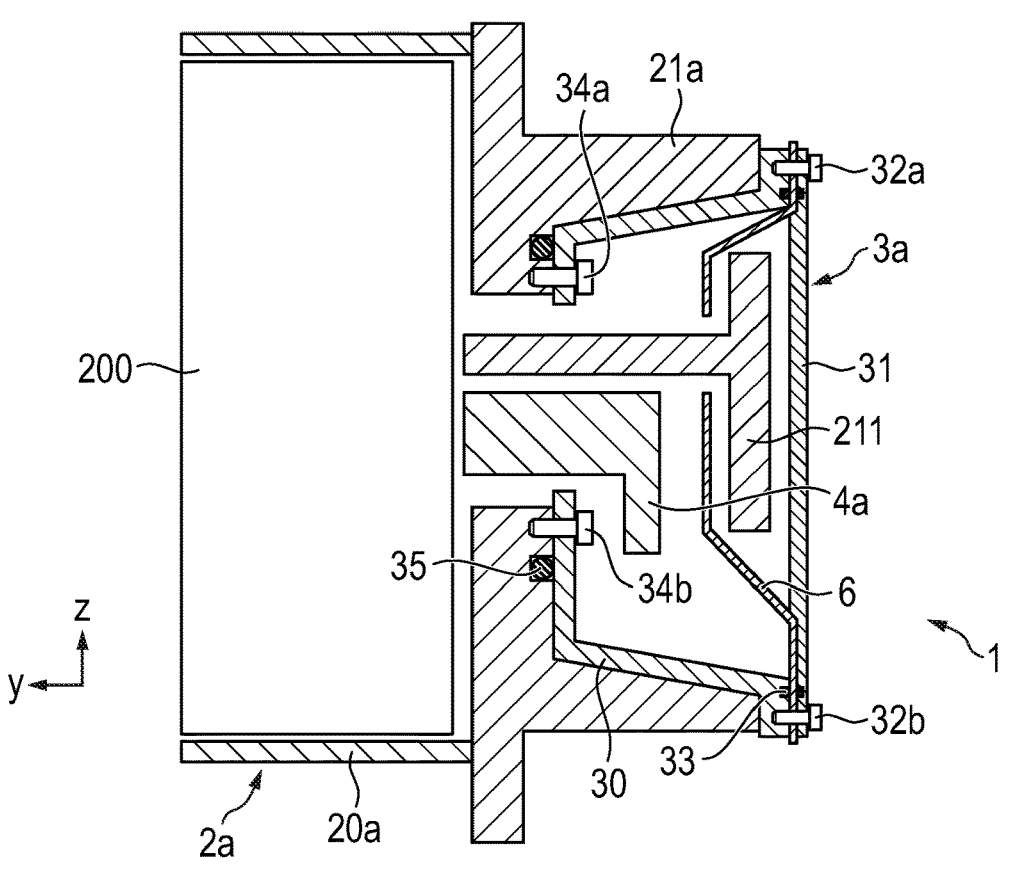
FIG. 8 is a schematic, highly simplified horizontal sectional view of the traction battery according to FIG. 7.

Referring to FIGS. 7 and 8, a second embodiment example of a traction battery 1 will be explained in further detail below. The basic construction corresponds to that of the first embodiment example. Thus, components of the traction battery 1 that are the same or at least functionally the same bear the same reference numbers as in FIGS. 1 to 6. The following serves therefore primarily to explain the constructive differences between the two embodiment examples in further detail.

In FIGS. 7 and 8, only a single battery module 2a of the traction battery 1 is shown for reasons of simplification. However, the traction battery 1 has a plurality of further battery modules 2b-2f that are electrically connected to one another and to the central battery control device 5 of the traction battery 1.

The battery module 2a shown as an example herein in turn comprises a battery module housing 20a, within which at least one battery cell stack 200 or at least one battery cell is housed. On the front face, the battery module housing 20a comprises a housing lid 21a. As in the first embodiment example, the traction battery 1 comprises two sealed conduit housings 3a, 3b which extend perpendicular to the opposing front faces of the battery modules 2a-2f and thus substantially parallel to the two vehicle longitudinal members of the vehicle. In FIGS. 7 and 8, only one of the two conduit housings 3a, 3b is shown as an example.

The conduit housing 3a shown in FIGS. 7 and 8 is in turn designed in two parts and comprises a bottom shell 30 and a housing lid 31, by means of which the bottom shell 30 can be covered. The housing lid 31 is screwed to the bottom shell 30 by means of several screws 32a, 32b. At least one sealing element 33 provides an effective seal between the housing lid 31 and the bottom shell 30.

In this embodiment example, the at least one battery cell controller 211 of the battery module 2a is housed within the conduit housing 3a and is electrically connected to the at least one battery cell stack 200. This arrangement of the battery cell controller 211 of the battery module 2a within the conduit housing 3a has the advantage that the battery cell controller 211 can be very easily replaced in the case of servicing by opening the housing lid 31 of the first conduit housing 3a.

Further, a shielding element 6 is positioned within the conduit housing 3a between the busbar 4a and the battery cell controller 211, which element is electrically conductively connected to the conduit housing 3a. This shielding element 6, which can in particular be configured as a shielding element, performs the function of an electromagnetic shielding between the busbar 4a and the battery cell controller 211. The shielding element 6 is thus designed as a separate component, differently than in the first embodiment example.

The bottom shell 30 of the conduit housing 3 is screwed to the battery module housing 20a, in particular to the housing lid 21a of the battery module housing 20a, by means of several screws 34a, 34b (preferably by means of two screws 34a, 34b). At least one sealing element 35 is arranged between the conduit housing 3a and the connection region 208 of the battery module 2a, such that the interior of the battery module housing 20a and the interior of the conduit housing 3a form a common space that is sealed against the environment.

A significant advantage of the two embodiment examples of the traction battery 1 presented herein is that the busbars 4a, 4b can be effectively protected against damage and environmental influences, in particular against moisture and dust, due to their accommodation in the sealed conduit housings 3a, 3b. This leads to a greater operational safety of the traction battery 1.

Further advantages result from improved design space efficiency, weight and cost savings due to a reduced weight of the busbars 4a, 4b, and a reduced design space dimension in the vertical direction (z-direction), because no high-voltage conduit is required above the battery modules 2a-2f.

What is claimed is:
1. A traction battery for an electrically or semi-electrically driven vehicle, said traction battery comprising:
 a central battery control device;
 a plurality of battery modules connected to the central battery control device, the plurality of battery modules arranged one behind the other in a longitudinal direction of the vehicle, each battery module comprising at least one sealed battery module housing and at least one battery cell housed within the battery module housing, wherein each of the battery modules is configured to extend in a transverse direction of the vehicle between a left and a right vehicle longitudinal member;

wherein each of the battery modules includes two opposing front faces, and a connection region disposed on both of the two opposing front faces, each connection region including an electrical connector;

at least one respective busbar disposed in a region of each of the two front faces of the battery modules, which at least one respective busbar extends transversely to the connection regions and is substantially parallel to one of the vehicle longitudinal members and is configured to electrically connect at least two of the battery modules to one another and/or to the central battery control device; and a respective sealed conduit housing in the region of each of the two front faces of the battery modules, which respective sealed conduit housing is mechanically connected to the connection regions of the battery modules and within which at least one of the busbars is respectively housed.

2. The traction battery according to claim 1, wherein each of the battery modules comprises a battery cell controller.

3. The traction battery according to claim 2, wherein each of the two conduit housings comprises a housing bottom shell and a housing lid that is releasably fastened to the housing bottom shell.

4. The traction battery according to claim 3, wherein the housing bottom shell constitutes an electromagnetic shield.

5. The traction battery according to claim 3, further comprising a shielding element arranged within the conduit housing, which shielding element is electrically connected to the conduit housing and constitutes an electromagnetic shield.

6. The traction battery according to claim 2, wherein the battery cell controller of each of the battery modules is arranged within one of the conduit housings.

7. The traction battery according to claim 1, wherein each of the battery modules comprises a plurality of battery cells arranged one behind the other in the vehicle longitudinal direction and/or adjacent to one another in the vehicle transverse direction.

8. The traction battery according to claim 7, wherein the battery cells are arranged as a battery cell stack, wherein each of the battery cell stacks comprises at least two battery cells positioned one above the other in a vehicle vertical direction.

9. The traction battery according to claim 1, further comprising at least one sealing element that is respectively arranged between the conduit housings and the connection regions of the battery modules.

10. A vehicle having a fully electric or semi-electric drive apparatus and a traction battery configured so as to provide electrical power to the drive apparatus, wherein the traction battery is configured according to claim 1.

\* \* \* \* \*